United States Patent
Hilckmann et al.

(10) Patent No.: US 11,284,734 B2
(45) Date of Patent: Mar. 29, 2022

(54) BREWING MODULE AND DRINKS PREPARATION MACHINE

(71) Applicant: Tchibo GmbH, Hamburg (DE)

(72) Inventors: Marius Hilckmann, Nottuln (DE); Friedrich Kroos, Greifensee (CH)

(73) Assignee: TCHIBO GMBH, Hamburg (DE)

( * ) Notice: Subject to any disclaimer, the term of this patent is extended or adjusted under 35 U.S.C. 154(b) by 465 days.

(21) Appl. No.: 16/471,822

(22) PCT Filed: Dec. 20, 2017

(86) PCT No.: PCT/EP2017/083930
§ 371 (c)(1),
(2) Date: Jun. 20, 2019

(87) PCT Pub. No.: WO2018/115187
PCT Pub. Date: Jun. 28, 2018

(65) Prior Publication Data
US 2020/0093316 A1    Mar. 26, 2020

(30) Foreign Application Priority Data
Dec. 22, 2016 (EP) .................................... 16206249

(51) Int. Cl.
A47J 31/36    (2006.01)
A47J 31/46    (2006.01)
A47J 31/44    (2006.01)

(52) U.S. Cl.
CPC ....... *A47J 31/3633* (2013.01); *A47J 31/3623* (2013.01); *A47J 31/4492* (2013.01); *A47J 31/468* (2018.08)

(58) Field of Classification Search
CPC ................ A47J 31/4492; A47J 31/3623; A47J 31/3628; A47J 31/3638; A47J 31/3633; A47J 31/3676
(Continued)

(56) References Cited

U.S. PATENT DOCUMENTS

| 10,667,646 | B2 * | 6/2020 | de Graaff | ............ A47J 31/4492 |
| 10,993,575 | B2 * | 5/2021 | Krug | .................... A47J 31/3676 |

(Continued)

FOREIGN PATENT DOCUMENTS

| CH | 707374 | 6/2014 |
| WO | 2010/118544 | 10/2010 |

(Continued)

OTHER PUBLICATIONS

English translation of International Preliminary Report on Patentability dated Jun. 25, 2019 (dated Jun. 25, 2019), Application No. PCT/EP2017/083930, 6 pages.

*Primary Examiner* — Reginald Alexander
(74) *Attorney, Agent, or Firm* — Rankin, Hill & Clark LLP

(57) ABSTRACT

A brewing module for preparing a brewed drink from a portion capsule includes a first brewing module part and a second brewing module part which is movable relative to this between a first brewing module part position and a second brewing module part position, wherein a movement of the second brewing module part relative to the first brewing module part can be driven by a manual or motorised drive via a transmission mechanism. A capsule recognition device with an optical sensor for detecting optical characteristics of the capsule is further present. The brewing module has a mechanically driveable blowing device that is arranged to produce an airflow at the side of the window element towards the portion capsule. The blowing device is assembled such that it is driven by a relative movement of elements of the brewing module which is produced by the drive or the transmission mechanism.

12 Claims, 4 Drawing Sheets

(58) Field of Classification Search
USPC .............................................. 99/289 R, 302 P
See application file for complete search history.

(56) References Cited

U.S. PATENT DOCUMENTS

2016/0166105 A1\* 6/2016 Bugnano ............ B65D 85/8043
　　　　　　　　　　　　　　　　　　　　　　426/232
2017/0251862 A1\* 9/2017 Bolognese .......... A47J 31/3633
2018/0352996 A1\* 12/2018 Krug .................. A47J 31/4492

FOREIGN PATENT DOCUMENTS

| WO | 2015/039258 | 3/2015 |
| WO | 2015/048914 | 4/2015 |
| WO | 2016/087190 | 6/2016 |
| WO | 2016/091859 | 6/2016 |
| WO | 2016/091860 | 6/2016 |
| WO | 2016/091861 | 6/2016 |

\* cited by examiner

BREWING MODULE AND DRINKS PREPARATION MACHINE

BACKGROUND OF THE INVENTION

Field of the Invention

The invention relates to extraction appliances for preparing drinks or the like, from an extraction material, for example ground coffee, which is contained in a portion capsule. In particular, it relates to a brewing module for an extraction appliance, to a capsule recognition module as well as to a drinks preparation machine with such a brewing module and/or capsule recognition module.

Description of Related Art

Extraction appliances for preparing drinks or the like from an extraction material, which is present in a portion packaging, are known, for example, as coffee or espresso machines. In many corresponding systems, the portion packages are designed as capsules, in which the extraction material is sealed off, for example in an airtight manner. For extraction, the capsule is pierced, for example at two sides that are opposite one another. An extraction liquid—generally hot water—is then introduced at the first side. The extraction product is led out of the capsule at the second side. Such is effected in a so-called brewing module. Such a brewing module includes a brewing chamber, in which the capsule is received. Brewing modules, concerning which the capsule is inserted and the brewing chamber is closed manually by way of an operating lever or automatically in a motorised manner are particularly popular, wherein the capsule is automatically removed from the brewing chamber and ejected into a capsule container on renewed opening of the brewing chamber after the brewing procedure. Such brewing modules with an automatic capsule ejection are generally designed as horizontal brewing modules, i.e. the capsule insertion is effected from above, the closure of the brewing chamber is a horizontal relative movement of two brewing module parts, the brewing fluid flows essentially horizontally and the capsule container is formed below the brewing chamber.

In this context, one area of difficulty relates to the acquisition or detection of capsule characteristics, for example to the reading-out of information that is present on the capsule, for activating a brewing process in dependence on this information. One possibility with regard to this is to provide the capsule with a suitable marking or colour combination and to optically detect this. Such is effected, for example, by way of a camera. Since the brewing chamber on operation is itself too hot and prone to contamination, the detection of the information is generally effected before the brewing process whilst the capsule is still situated outside the brewing chamber, at a capsule recognition position. However, practical problems then also arise with such a process, which is carried out in the direct proximity of the brewing chamber. On account of the heat, which is dissipated by the brewing chamber, water vapour and contamination, on the one hand it is desirable to attach a camera as remotely as possible from the brewing chamber and in a manner shielded from this. On the other hand, suitable shieldings—for example in the form of windows—render the read-out process itself more difficult, in particular if they fog or become contaminated. The usual measures to combat such a fogging or contamination are coatings, which, however, are only effective to a limited extent in the environment of a brewing chamber.

For this purpose, it has been suggested in WO 2016/087192 to provide a fan that produces an airflow at the side of such a shielding window—such a window also being able to have a lens function. The problem of fogging is reliably overcome by way of this. However, such a fan is relatively expensive and therefore increases the costs of a drinks preparation machine and furthermore it takes up much space.

SUMMARY OF THE INVENTION

It is the object of the invention to provide a drinks preparation machine and a brewing module for such, which overcome the disadvantages of the state of the art and which have a simple as possible design and despite this permit a reliable optical capsule recognition in the proximity of the brewing chamber. The design should preferably also be suitable for the implementation as a brewing module that is to be actuated manually.

According to the invention, a brewing module for preparing a brewed drink from a portion capsule is provided, the brewing module including:
- a first brewing module part and a second brewing module part, the second brewing module part being movable relative to the first brewing module part between a first brewing module part position and a second brewing module part position,
- wherein a movement of the second brewing module part relative to the first brewing module part can be driven by a manual or motorised drive via a transmission mechanism,
- wherein, in the second brewing module part position, a brewing chamber is formed which, during a brewing procedure, at least partly surrounds the portion capsule situated in a brewing position, wherein the brewing module is configured to brew a brewed drink by way of introducing a brewing fluid into the portion capsule and to discharge the brewed drink out of the capsule; and
- wherein the brewing module further includes a capsule recognition device with an optical sensor, in particular a camera, for detecting optical characteristics of the capsule located at a capsule recognition position, as well as with a window element of a transparent material between the capsule recognition position and the optical sensor.

Such a window element can be a conventional window pane of a transparent material (for example, glass or a transparent plastic) with planar-parallel surfaces, or it can optionally have a lens function. In particular, the window element can also act as a camera lens of the camera.

The brewing module is characterised by a mechanically driveable blowing device for producing an airflow, the blowing device being arranged to produce an airflow at the side of the window element towards the capsule recognition position. The blowing device is assembled such that it is driven by a relative movement of elements of the brewing module, the relative movement being produced by the drive or the transmission mechanism.

In particular, this relative movement of the elements of the brewing module can be a movement that takes place in normal operation in any case, thus for example the actuation of an actuation element for closing the brewing module and/or the closing of the brewing chamber. The mentioned elements of the brewing module, which are subjected to the relative movement, in particular can be such an actuation element, the second brewing module part, elements of the transmission mechanism and/or parts that are fixed with regard to the housing.

The window element is that transparent part of the capsule recognition device which separates the light-sensitive element of the optical sensor from the region, at which the capsule is located and through which the capsule recognition takes place. If several such transparent elements are arranged in a successive manner, then, considered from the camera, it is the outermost such transparent element that lies closest to the capsule recognition position. This transparent part is generally a window with or without lens functions (in this context a camera lens is also indicated as a "window" if it simultaneously separates the region of the light-sensitive element from the region of the capsule).

The airflow is led over the window at the capsule side, in order to counteract a fogging of the window and also in order to clean it.

In embodiments, the blowing device is driven between two coupling points by way of these coupling points being moved relative to one another, and specifically such that their distance reduces or increases. By way of this, the blowing device can act in the manner of a bellows.

According to this principle, the blowing device includes a first blowing device element and a second blowing device element, between which an active volume forms, the active volume being able to be enlarged or reduced by a relative movement of the first and the second blowing device element. The active volume is connected to at least one air connection, through which air is sucked into the active volume or air is blown out of the active volume, when moving the first and second blowing device element relative to one another.

According to a first example, the blowing device can include a cylinder (as a first blowing device element) and a piston (as a second blowing device element), which is displaceable in the cylinder and which, due to the movement in the cylinder, enlarges or decreases an active volume and therefore either sucks air into the cylinder or presses air out of the cylinder. A pumping effect can therefore be achieved by way of the cylinder including two air connections with suitable valves, wherein air is sucked from a certain location on enlarging the active volume and is blown out at another location in the proximity of the window element on reducing the volume.

According to a second example, the blowing device can be designed as a bellows in the strictest sense, by way of the movement of the coupling points effecting a movement of two plates, as the blowing device elements, relative to one another, between which plates a flexible, for example suitably folded membrane surrounds a volume, whose size changes given the relative movement. According to this example too, two air connections, which are provided with valves, can be present, as is known from bellows.

Further types of blowing devices that can be driven by translatory movements and/or pivoting movements or possibly rotatory movements (for example of a cog of the transmission mechanism) are likewise conceivable.

It is also conceivable, by way of a suitable design of the blowing device and/or of a connection tube, which leads from the blowing device to the window element, and of an outflow opening to the window element, for the airflow to continue for a certain time by way of the blowing device or the connection tube (in particular, by way of utilising the elasticity of applied materials in combination with a throttling outflow opening) or also an intermediately arranged balloon-like store, storing air. By way of this, the effect of the window element still being kept free can be accomplished even after the relative movement of the elements of the brewing module, for example during the actual capsule recognition procedure. Whereas two air connections of the blowing device, which are provided with valves, permit a directed or targeted leading of the air—the air is sucked from one location and is blown out at another location, towards the window element—a solution with merely one air connection is also not ruled out. The air is then not only blown out at the window element, but is also sucked there. An airflow over the window element, the airflow combating a fogging and a contamination, also arises with this solution.

In a group of embodiments, the drive is a purely mechanical drive. In particular, the brewing module can include an operating element that is movable manually between a first and a second operating element position, in order via the transmission mechanism, to effect a movement of the second brewing module part relative to the first brewing module in a direct or indirect manner. Such an operating element then belongs to the mechanical drive or forms this.

In particular, such an operating element can be an operating lever, which can be brought from the first into the second position by way of a tilting movement from the top to the bottom. In the second position, the operating lever, for example, closes a capsule insert opening that is formed by a housing of the drinks preparation machine—for example of the brewing module.

In embodiments of the mentioned group, the blowing device is arranged between a first coupling point, which is arranged at the operating element, and a second coupling point, which, for example, is fixed with respect to the housing. The mentioned coupling points can possibly be fixedly connected to the first or to the second blowing device element.

In embodiments of the first group, the brewing module can further include an energy store that is configured to intermediately store energy, which is coupled into the brewing module by way of moving the operating element from the first into the second position, and to again convert it, activated by a release, into a movement from the first brewing module part position into the second brewing module part position.

In particular, such an energy store can be a spring, wherein the moving of the operating element into the second position is then effected counter to the force of the spring and the spring is loaded by way of this. After the release, the spring is relaxed by way of the second brewing module part being moved relative to the first brewing module part.

Furthermore, a damping mechanism can be present, the damping mechanism preventing the second brewing module part—which is to say the operating element—from being accelerated too greatly given the movement, which is accordingly caused by the spring—and from hitting a stop too rapidly due to this. Such a damping mechanism can be formed in the energy store itself or separately from this. In an example, the energy store is a gas compression spring. Such has the advantage that a damping mechanism can be integrated into the spring from the very beginning.

For moving the second brewing module part into the second brewing module part position, the energy store, for example directly or indirectly, exerts a force onto the second brewing module part in the direction of the second brewing module part position and onto the operating element in the direction of the first position. The brewing chamber closes if the energy store is filled and the second brewing module part is not blocked, and the operating element moves back in the direction of the first position when the energy store is filled and the operating element is not blocked. The latter can be used if a preparation procedure is to be aborted, i.e. if the capsule insert opening is to be accessible again, so that the capsule can be removed.

In particular, if such an energy store is a spring, for example a compressed air spring, the blowing device can be arranged for example parallel to the energy store, i.e. be mounted between the same two axes that on operation move relative to one another on charging and discharging the energy store.

Embodiments with an energy store can include a first locking mechanism that is configured, depending on the state, to prevent or enable a movement of the second brewing module part away from the first brewing module part.

Supplementarily or alternatively, such embodiments can also include a second locking mechanism that is configured, depending on the state, to prevent or enable a movement of the operating element away from the second operating element position.

In a second group of embodiments, the drive is a motoric drive. A linear movement of the brewing module parts relative to one another can also be effected by such via the transmission mechanism. The drive of the blowing device is then preferably effected by way of this device being arranged between elements of the transmission mechanism, the second brewing module part and/or a point, which is fixed with regard to the housing.

In embodiments of the first group as well as in embodiments of the second group, the blocking device can be arranged between a first coupling point, which is connected to the second brewing module part, and a second coupling point, which, for example, is fixed with respect to the housing.

In further embodiments, the blowing device is arranged between (other) elements of a lever mechanism, the lever mechanism forming the transmission mechanism.

An arrangement that effects an airflow to the capsule recognition device directly before the capsule recognition is particularly advantageous. In particular, this is the case with arrangements with which the blowing device is actuated directly or via the transmission mechanism by way of moving the actuation element.

The second brewing module part is movable for example relative to the first brewing module part by way of the first brewing module part being assembled in a fixed manner with respect to the housing and the second brewing module part being movable relative to the housing, in particular in a linear-translatory, in particular horizontal manner. However, a movement of both brewing module parts relative to the housing or a movement of only the first brewing module part relative to the housing is not ruled out.

The second brewing module part can be an injector, by way of which the portion capsule is pierced and from which, for example, hot water as a brewing fluid is introduced into the portion capsule. The first brewing module part can form a discharge device for leading the extraction product out of the capsule. For this purpose, it includes, for example, extraction-side piercing elements for the extraction-side piercing of the capsule or other structures that open the capsules at the extraction side.

The capsule recognition device is configured to carry out an optical capsule recognition, i.e. to read out optical features of the portion capsule via an optical sensor. For this, an illumination means can also be present, the means illuminating the capsule in a controlled manner. In particular, the optical sensor is a camera and for this purpose includes a camera sensor with a sensor array (for example, CCD or CMOS array).

With such a capsule recognition device, in particular one can firstly determine whether the inserted capsule is suitable for use in the drinks preparation machine at all or not—and this is known per se. Secondly, there exists the possibility of outputting corresponding information to the user, for example via a display, on the basis of the recognised capsule characteristics. For example, the drink type (coffee, tea, etc.), the sort (e.g., "100% Arabica"), the recommended preparation manner (e.g., "espresso", "ristretto" or "lungo" etc.) and/or other information can be displayed. Thirdly, the program, which is implemented by the coffee machine for the brewing, can be selected on the basis of the recognised capsule sort; for example the brewing pressure, the brewing duration as well as possibly also the temperature and/or other characteristics can be set depending on whether the inserted capsule is envisaged for the preparation of, e.g., ristretto, espresso or lungo.

Suitable, optically readable features, for example are a bar code, a 2D matrix code (for example, QR code or Aztec code), a pictogram (icon), and/or a certain colouring. A code according to WO 2016/091859, WO 2016/091860 and/or WO 2016/091861 is also considered.

In the context of the present teaching, the capsule recognition device is assigned to the brewing module since it belongs to that part of the drinks preparation machine that receives the capsule and interacts with it, the part indeed being called the brewing module in this text. A brewing module in the context of the present text can, but does not need to be present as a separate, autonomous and exchangeable module. It can also be composed of different components that are integrated into the drinks preparation machine.

The capsule recognition position, at which the recognition of the optical features takes place, is preferably different from the brewing position and can, for example, be above this.

In these embodiments, a transport of the capsule from the capsule recognition position into the brewing position, for example by way of its dropping downwards, is effected before or during the movement of the second brewing module part relative to the first brewing module part for closing the brewing chamber. For this purpose, one can, for example, envisage a holding means, which at least partly engages below the capsule at the capsule recognition position, being retracted.

At the entry side, the blowing device—for example via an air suction tube—can be connected to a region of the drinks preparation machine, in which particularly dry and/or particularly warm air is located, in particular in the environment of the water heating means. Such a region can lie within or outside the drinks preparation machine housing. In an embodiment example, the air suction tube leads to a location next to the water heating means, where a slightly increased temperature prevails on account of arising heat and the air is therefore warmer.

The invention also relates to a drinks preparation machine with a brewing module of the discussed type.

BRIEF DESCRIPTION OF THE DRAWINGS

Embodiment examples of the invention are hereinafter described by way of figures. In the figures, the same reference numerals indicate the same or analogous elements. There are shown in.

SUMMARY OF THE INVENTION

Figure 1:
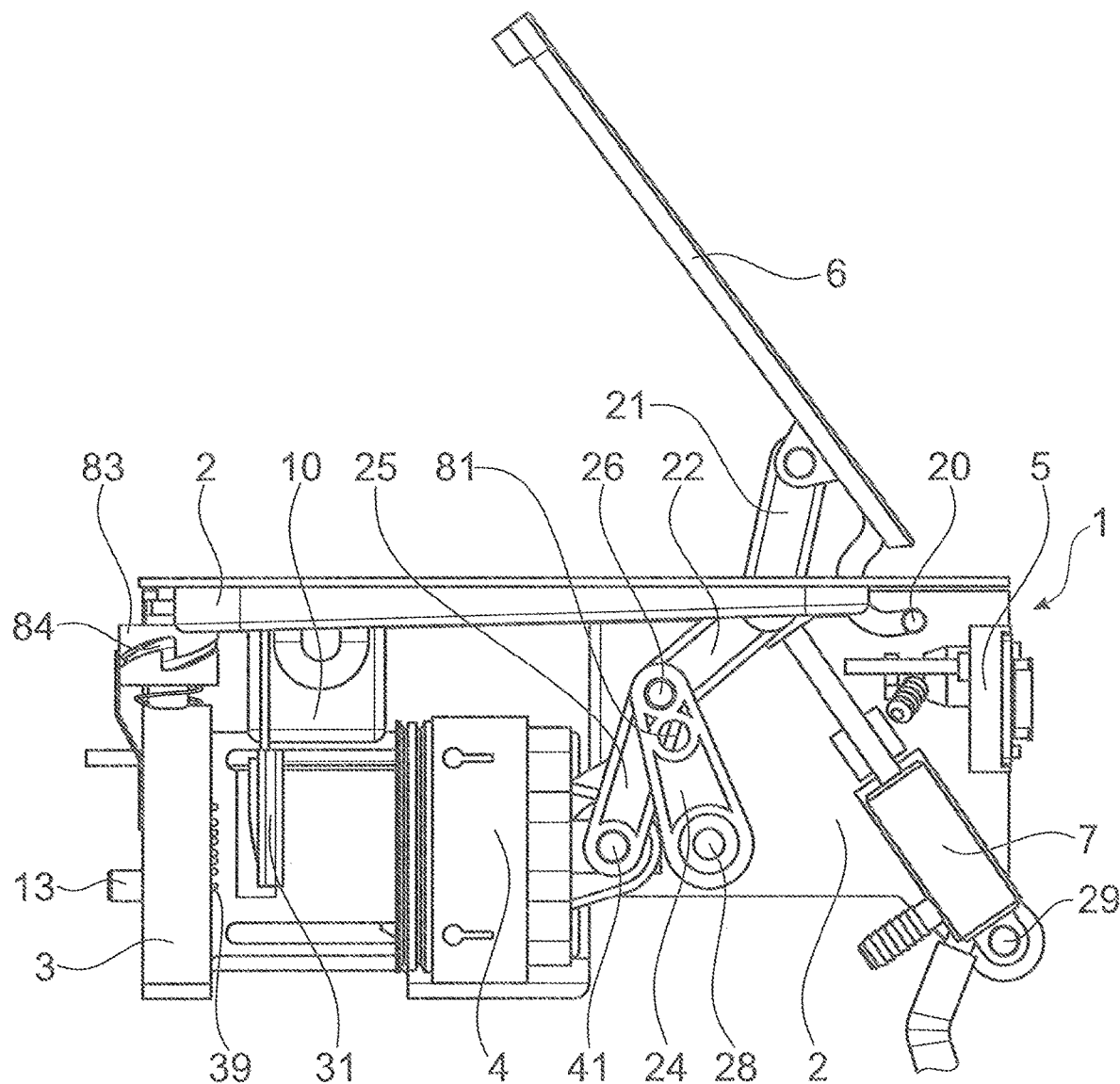
FIG. 1 a lateral view of a brewing module, wherein some parts, in particular housing parts have been omitted.

The brewing module 1 according to FIGS. 1-5 includes a brewing module housing 2. Two brewing module parts, specifically a discharge device 3 and an injector 4, which are movable relative to one another, are guided in the brewing module housing 2.

The injector 4 includes perforation elements for piercing a portion capsule 10, which is at least partly filled with an extraction material—for example ground coffee. The injector 14 is configured to introduce a fluid—for example hot water—through the perforation elements or past these into the pierced capsule, wherein the water can be fed via a water feed (not shown), which can include for example a flexible tube.

With the embodiment example described here, the discharge device 3 also includes perforation elements, specifically extraction-side piercing tips 39. These can be designed, for example, as is described in WO 2015/039258 or in WO 2010/118544 or have another design, and the application of principles other than piercing tips, for example with grating-like structures are also possible.

The discharge device moreover includes guide means 31, which at both sides of the capsule project towards the injector side, as are described for example in WO 2015/048914, the contents of which relating to the manner of functioning of these guide means being expressly referred to here.

As is known per se, for preparing a brewed drink, a capsule is placed between the discharge device 3 and the injector 4, and these are moved towards one another such that a brewing chamber encompassing the capsule is formed between these. The hot water is fed under pressure through the injector to the capsule, and the extraction product flows through the discharge device 3 via a drinks outlet 13 into a drinks vessel, which is placed therebelow for example.

The relative movement of the second brewing module parts (injector) relative to the first brewing module part (discharge device) in the embodiment example described here is achieved by way of the discharge device 3 being assembled in a manner in which it is fixed to the housing, whereas the injector 4 is movable along the horizontal axis.

A capsule recognition position, into which the capsules go after insertion through a capsule insert opening, is located above the brewing position, which lies between the discharge device 3 and the injector 4. Apart from the brewing chamber unit with the discharge device 3 and the injector 4, the brewing module accordingly includes a capsule recognition device 5 with a camera 5, whose construction corresponds, for example, at least partly to the construction described in WO 2016/087190.

In particular, the brewing module is configured to hold the capsule, which is inserted through the capsule insert opening in the capsule recognition position, before it goes downwards into the brewing position after the capsule recognition has been effected or possibly after a further step (for example, activation of the brewing by the user). For this purpose, for example a mechanism that includes an element, which engages below the capsule at the capsule recognition position and which is retractable in an electromechanically controlled manner for the transition into the brewing position, can be present. Other mechanisms that operate in a purely mechanical manner are also conceivable.

The brewing module includes an operating lever 6 for the operation by the user for the purpose of closing the brewing chamber, the operating lever being mounted at a first fixed mounting location 20 and being pivotable about this. The transmission mechanism from the operating lever 6 to the injector 4 is a lever mechanism and includes a first toggle lever and a second toggle lever. The first toggle lever is formed by a first lever arm 2,1 which engages on the operating lever, and by a second lever arm 22, the lever arms being pivotably connected to one another via a first toggle lever bolt 23, so that a first toggle joint forms. The second toggle lever is formed by a third lever arm 24 and a fourth lever arm 25 that are pivotably connected to one another via a second toggle lever bolt 26, so that a second toggle joint is formed. The third lever arm 24 is mounted at a second fixed mounting location 28 and is pivotable about this. The fourth lever arm 25 engages on the injector 4 and is pivotable about a bearing journal 41 of the injector 4. The injector 4 is mounted such that it is horizontally displaceable between the first brewing module part position (represented in FIG. 1) and the second brewing module part position (visible in FIG. 3).

The second lever arm 22 engages on the second toggle lever, for example by way of it being engaged with the second toggle lever bolt 26

A gas compression spring 7, which extends between a third fixed mounting location 29, about which the gas compression spring is pivotable, and the first toggle joint, engages on the first toggle joint, wherein it is engaged for example with the first toggle lever bolt 23.

The brewing module further includes two locking mechanisms.

A first locking mechanism is configured to prevent a movement of the second brewing module part away from the first brewing module part position. In the represented embodiment example, the first locking mechanism includes a locking bolt 81 that is displaceable in the axial direction, for example in a magnetically activated manner, and which can be brought into engagement with the third and the fourth lever arm, in order to prevent a pivoting of the third and fourth lever arm relative to one another in the blocked state, which—since the third lever arm is connected to a fixed mounting location—also completely prevents a movement of the injector 4. It would alternatively also be possible to provide a locking mechanism that can be brought into engagement with the injector in a direct manner or that is configured to prevent a movement of the third or fourth lever arm relative to the housing.

A second locking mechanism is configured to block the operating lever relative to the housing 2. In the represented embodiment, the second locking mechanism functions according to the known so-called ballpoint pen principle. For this, a locking sleeve 83 is present, the locking sleeve being able to be pressed downwards by the operating lever itself against a spring force and being guided such that it is rotated about a predefined angle—for example 90°—with each pressing downwards. The rotation can be accomplished for example in a manner known per se by a cam groove 84 of the locking sleeve, into which groove a cam pin engages (not visible in the figures). Depending on the assumed orientation, the locking sleeve blocks a movement of the operating lever away from the second operating element position (FIG. 2 and FIG. 3) by way of locking wings 85 or releases it.

The described configuration permits the following operating sequence:

In the opened state, in which the operating lever 6 pivots upwards, at the first operating element position (FIG. 1), the capsule can be inserted through the capsule insert opening and therefore gets into the capsule recognition position.

The user subsequently actuates the operating lever 6 counter to the spring force of the gas compression spring 7 whilst the first locking mechanism blocks the second brewing module part. The operating lever gets from the first operating element position into the second operating element position. There, the operating lever is locked by the second locking mechanism.

In the represented embodiment example, the brewing module is also closed by way of bringing the operating lever into the second operating element position, whereby this can also entail the capsule at the capsule recognition position being shielded from the surrounding light.

Figure 2:
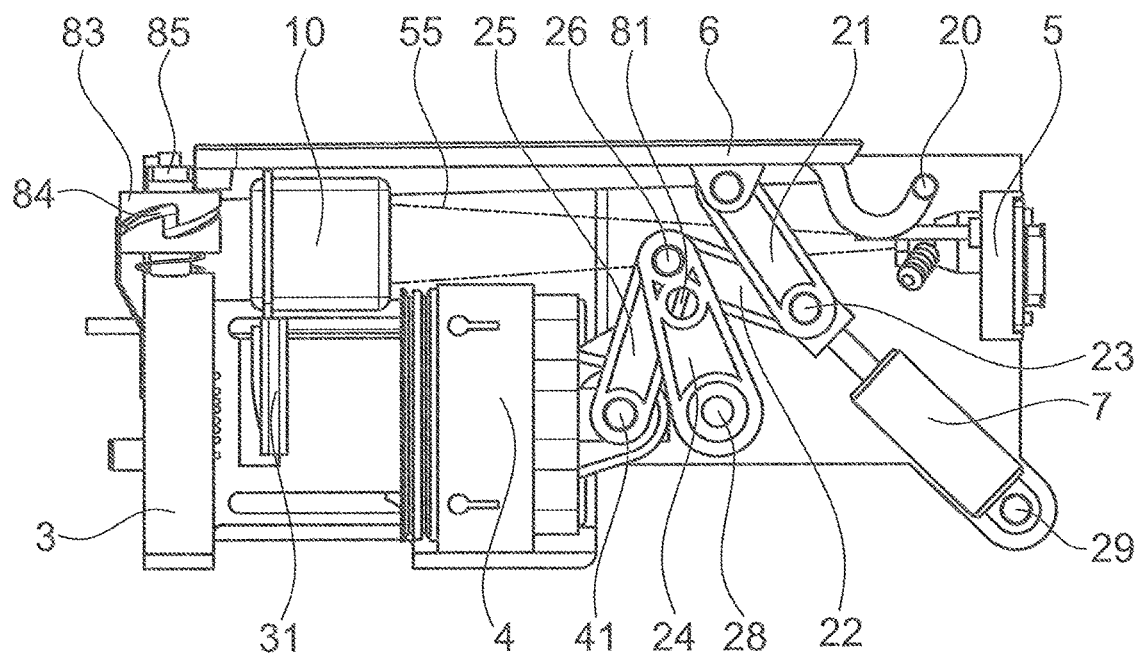
FIG. 2 a lateral view of the brewing module according to FIG. 1 during the capsule recognition.
Figure 3:
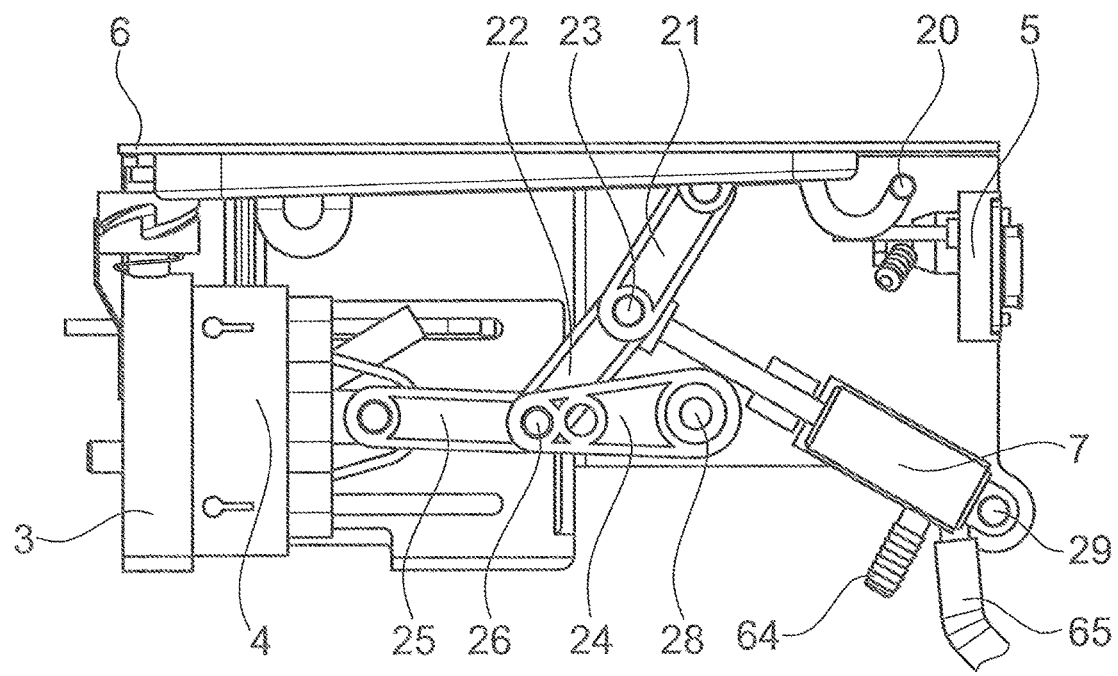
FIG. 3 a lateral view of the brewing module according to FIGS. 1 and 2 during the brewing process.
Figure 4:
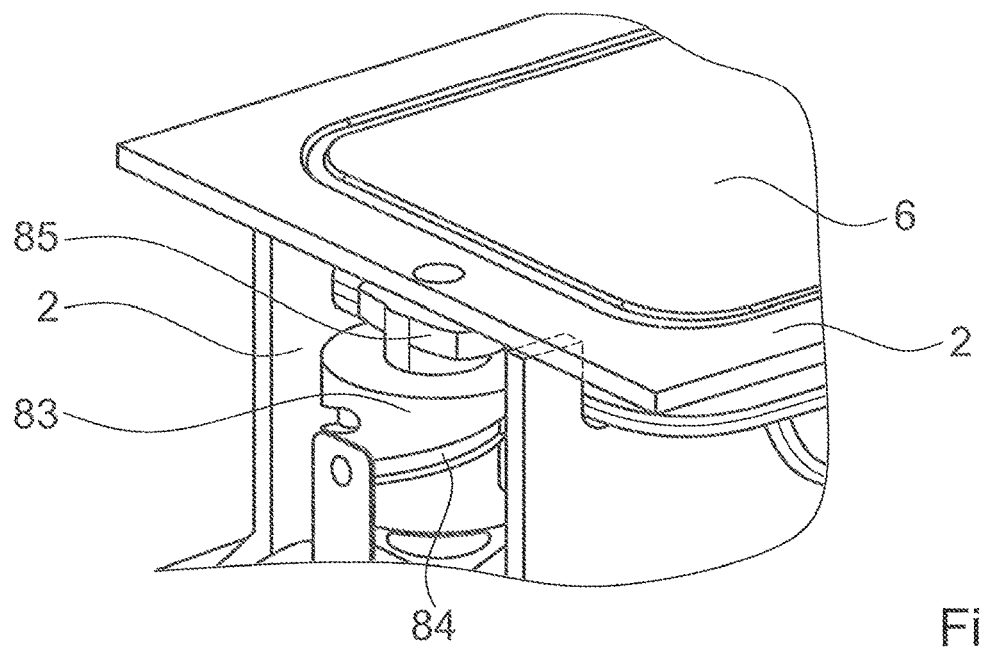
FIG. 4 a detail of the brewing module according to FIG. 1-3, the detail permitting the recognition of the second locking mechanism, FIG. 5 a detailed view of the brewing module according to FIG. 1-4, and FIG. 6 a schematic diagram of a coffee machine according to the invention.

The capsule recognition then takes place, for example, automatically without further ado by the user (a suitable sensor, for example switch, can determine that the operating lever is at the second operating lever position). FIG. 2 shows the brewing module during the capsule recognition. The capsule recognition can, for example, include the capsule 10 being illuminated—a light beam 55 is indicated in FIG. 2—and the illuminated capsule is detected by the camera, whereupon a code on the capsule or a colouring or the like is evaluated.

Activated by the successful capsule recognition or by an action of the user, a downwards movement of the capsule is subsequently effected and the brewing chamber is closed. For this, the blocking by the first locking mechanism is lifted, for example by way of an electromagnet that axially displaces the locking bolt 81 and thus releases it from the engagement with the third lever arm 24. The first toggle joint and consequently also the second toggle joint is elongated due to the spring force which is exerted by the gas compression spring, and this moves the injector 4 and closes the brewing chamber whilst the capsule is located therein.

The brewing process can then be effected in a manner known per se by way of hot water being introduced under pressure into the capsule, which is pierced on closure of the brewing chamber, and the arising brewed drink being discharged out of the discharge device via this device.

After the brewing has been effected, the blocking by way of the second locking mechanism is lifted again by way of the user pressing the operating lever slightly downwards, whereupon the user can pull the operating lever upwards. The second toggle lever is also flexed (bent) and brought into the position represented in FIG. 1 on account of the stiffness of the gas compression spring, whereupon the first locking mechanism can lock the second toggle lever. One can also effect the dropping downwards of the spent capsule into a capsule container by way of the opening. A corresponding mechanism is described for example in WO 2015/048914.

If, instead of bringing the capsule into the brewing position and closing the brewing chamber, the user wishes to remove it—for example if, on account of the capsule recognition, it has been ascertained that the selected capsule is not suited to the desired drink—then the user by way of pressing the operating lever downwards can lift the blocking by way of the second locking mechanism. The gas compression spring subsequently presses the operating lever upwards again, and the user can remove the capsule from the capsule recognition position.

Figure 5:
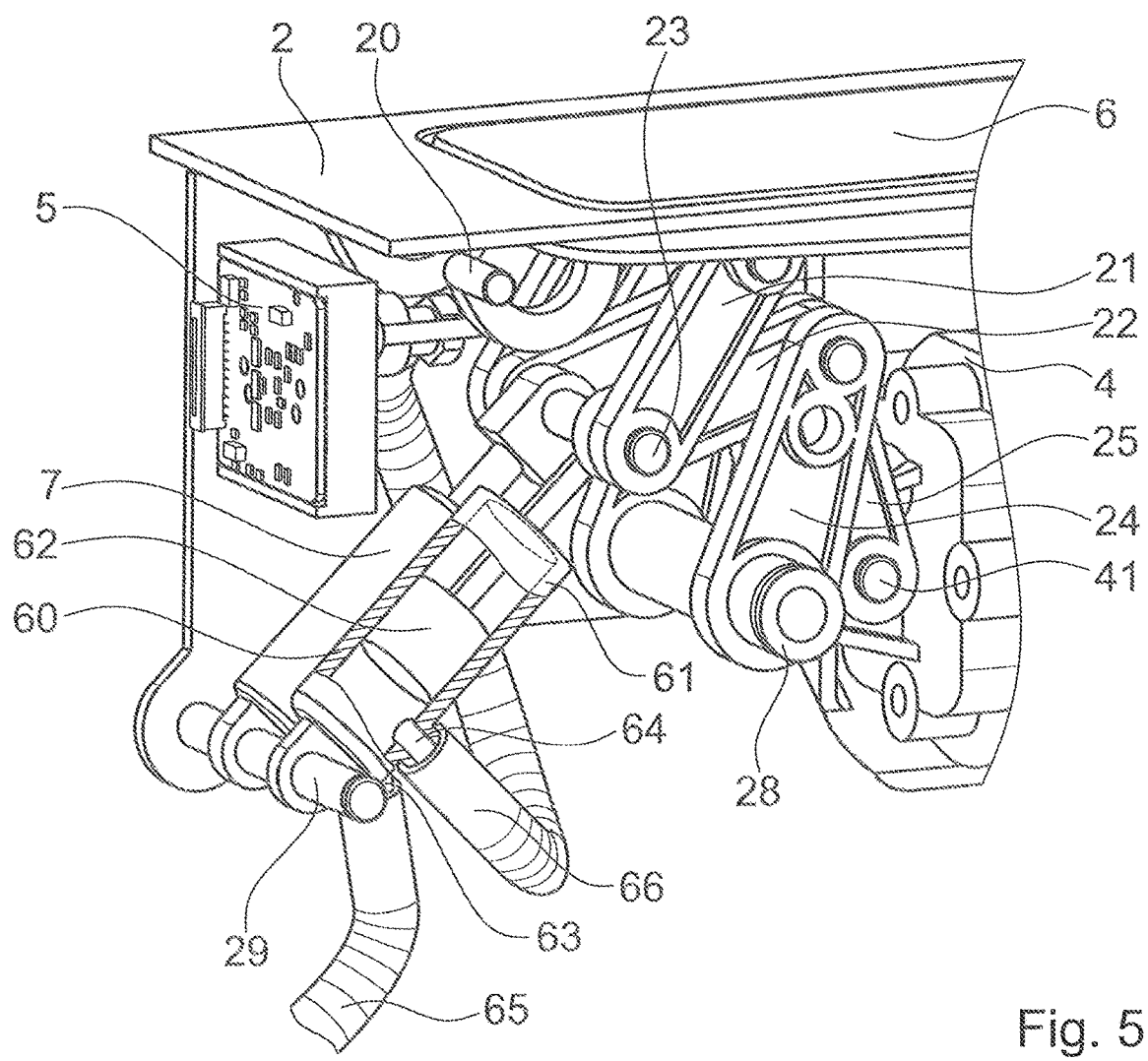

A further feature is particularly well visible in FIG. 5. Apart from the aforementioned elements, a blowing device 60—corresponding functionally to a bellows—is also connected to the lever mechanism. This blowing device here includes a cylinder 61 and a piston 62 that is displaceable in the cylinder. The cylinder 61 is pivotably mounted at the third fixed mounting location 29, whilst the piston 62 is connected to the first toggle lever bolt via a conrod, so that the piston 62 is also moved in the cylinder on loading or relaxing the gas compression spring. An active volume, which is enlarged or reduced by way of the displacement of the piston 62 in the cylinder, forms below the piston 62 in the represented orientation, in FIG. 5 to the left below the piston.

Two air connections 63, 64 run out into the active volume of the cylinder 61.

A first air connection 63 is connected to an air suction tube 65, through which air can be sucked. The tube leads, for example, to a location within or outside the drinks preparation machine housing, at which location one is to reckon with the presence of particularly dry and/or particularly warm air. In an embodiment example, the air suction tube leads to a location next to the water heating means, where a slightly increased temperature prevails due to the arising waste heat and air is therefore preheated.

A connection tube 66 is connected onto a second air connection 64, the connection tube leading to a region of the capsule recognition device 5 that, towards the capsule recognition position, is directly adjacent to a lens or a window, which is arranged between the camera sensor (for example, with a CCD or CMOS sensor array) and the capsule recognition position, and, for example, prevents hot vapours from getting out of the brewing chamber to the camera sensor.

The first and the second air connection 62, 63 and/or the respective tubes 65, 66, which are connected thereto, are each provided with a valve means—for example a simple valve, as is used in principle for inflating air balloons—which have the effect of air only being able to be sucked but not being able to be blown out through the first air connection and conversely air only being able to be blown out but not sucked through the second air connection.

The blowing device 60 is arranged parallel to the compressed air spring 7. By way of this, the air that is present in the cylinder 61 is blown through the connection tube in front of the lens or the window on loading the compressed air spring 7 by way of actuating the operating lever 6, by which a possible fogging or a contamination is removed and/or a fogging/contamination is prevented. The piston is moved back again on relaxing the compressed gas spring on closing the brewing chamber, by which means air is sucked.

A mechanically driven blowing device of the described type can also be arranged at a location other than the described one in the brewing module and can be actuated by way of relative movements of elements, for example parallel to the first toggle lever or possibly to the second toggle lever or between the brewing module housing and the injector. An arrangement that, as in the described embodiment example, permits an airflow to the capsule recognition device directly in front of the capsule recognition is particularly advantageous.

In FIG. 5, one can also see that in the present embodiment example, each lever arm is constructed of two lever arm elements, which are arranged symmetrically to a vertical middle plane, which however is not a necessity. The rotation points, which are described in this text, are accordingly designed as rotation axes or contain two rotation points, which are aligned to one another, symmetrically to the vertical middle plane.

Figure 6:
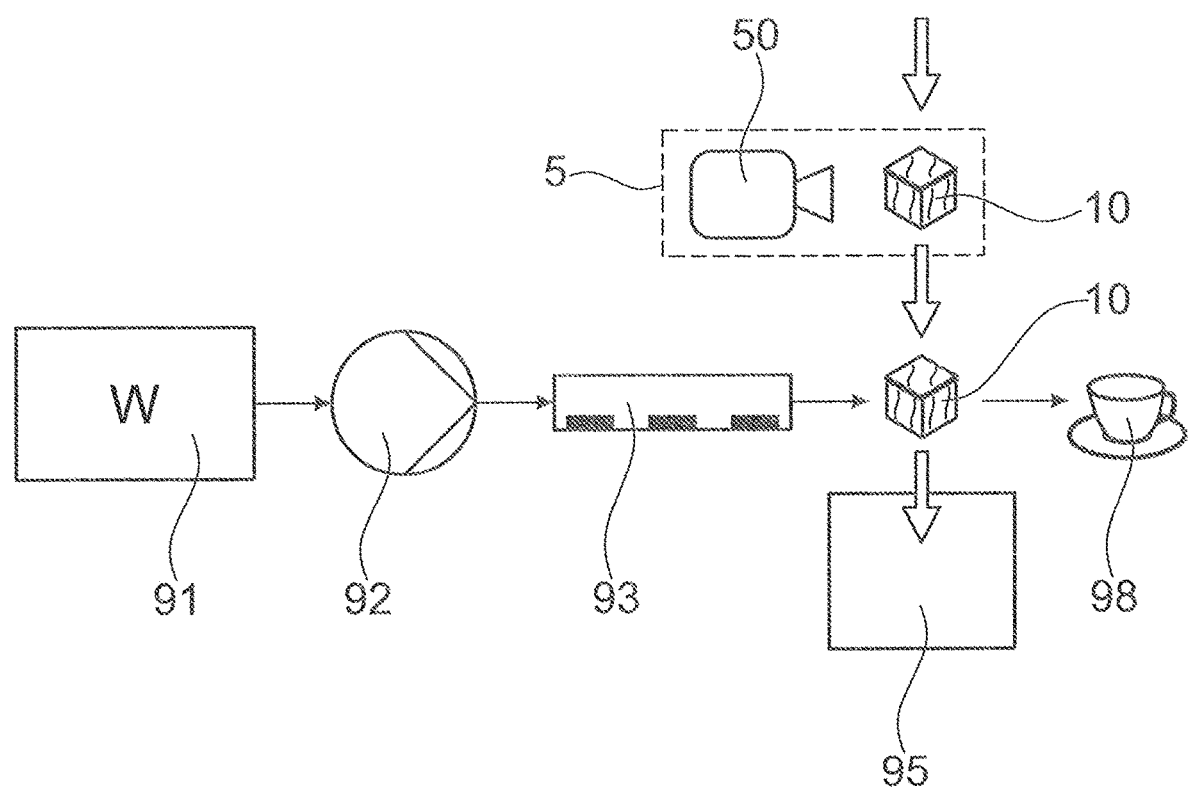

A machine according to the invention, for preparing a brewed drink from a portion capsule 10, here specifically a coffee machine, with a brewing module is schematically represented in FIG. 6. Apart from the brewing module, it includes a water tank 91, a pump 92 for feeding brewing water to the injector 4 and a water heating device 3 (for example, continuous heater). The capsule recognition module 5 with the camera 50 is located in particular above the brewing chamber. After the capsule recognition process, an inserted capsule, as described beforehand, can be transported further downwards by way of the effect of gravity. Furthermore, a capsule container 95, into which the capsules 1 drop or are transported after the brewing process is arranged below the brewing module. The reference numeral 98 indicates a coffee cup.

LIST OF REFERENCE NUMERALS 1 brewing module
2 brewing module housing
3 discharge device
4 injector
5 capsule recognition device
6 operating lever
7 compressed gas spring
10 portion capsule
13 drinks run-out
20 first fixed mounting location
21 first lever arm
22 second lever arm
23 first toggle lever bolt
24 third lever arm
25 fourth lever arm
26 second toggle lever bolt
28 second fixed mounting location
29 third fixed mounting location
31 guide means
39 extraction-side piercing tips
41 bearing journal
50 camera
55 light beam
60 blowing device
61 cylinder
62 piston
63 first air connection
64 second air connection
65 air suction tube
66 connection tube
81 locking bolt
83 locking sleeve
84 cam groove
85 locking wing
91 water tank
92 pump
93 water heating device
95 capsule container
98 coffee cup

The invention claimed is:

1. A brewing module for preparing a brewed drink from a portion capsule, comprising:
a first brewing module part and a second brewing module part, the second brewing module part being movable relative to said first brewing module part between a first brewing module part position and a second brewing module part position,
wherein a movement of the second brewing module part relative to the first brewing module part can be driven by a manual or motorised drive via a transmission mechanism,
wherein, in the second brewing module part position, a brewing chamber is formed which during a brewing procedure at least partly surrounds the portion part situated in a brewing position, wherein the brewing module is configured to brew a brewed drink by way of introducing a brewing fluid into the portion capsule and to discharge said brewed drink out of the capsule; and
and a capsule recognition device with an optical sensor for detecting optical characteristics of the portion capsule located at a capsule recognition position, as well as with a window element of a transparent material between the capsule recognition position and the optical sensor,
further including a mechanically driveable blowing device for producing an airflow, said blowing device being arranged to produce an airflow at the side of the window element towards the capsule recognition position by way of it being driven by a relative movement of elements of the brewing module, said relative movement being produced by the drive or the transmission mechanism.

2. The brewing module according to claim 1, wherein the blowing device comprises a first blowing device element and a second blowing device element, between which an active volume forms, wherein said active volume can to be enlarged or reduced by a relative movement of the first and the second blowing device element, and wherein the active volume is connected to at least one air connection, through which air is sucked into the active volume or air is blown out of the active volume, when moving the first and second blowing device element relative to one another.

3. The brewing module according to claim 2, comprising two air connections, wherein a first air connection is provided with or is connected to a first valve which only permits an airflow into the active volume, and a second air connection is provided with or is connected to a second valve which only permits an airflow out of the active volume.

4. The brewing module according to claim 3, wherein the first air connection is connected to an air suction tube, and the second air connection is connectable to a connection tube leading to the window element.

5. The brewing module according to claim 2, wherein the first blowing device element is a cylinder and the second blowing device element is a piston which is displaceable in said cylinder and which enlarges or reduces the active volume by way of movement in the cylinder.

6. The brewing module according to claim 1, wherein the drive is a mechanical drive and comprises an operating element which is manually movable between a first operating element position and a second operating element position.

7. The brewing module according to claim 6, wherein the blowing device is arranged between a first coupling point which is arranged at the operating element and a second coupling point which, for example, is fixed with regard to the housing.

8. The brewing module according to claim 6, comprising an energy store which is configured to intermediately store energy which is coupled into the brewing module by way of moving the operating element from the first into the second position, and to again convert it, activated by a release, into a movement from the first brewing module part position into the second brewing module part position.

9. The brewing module according to claim 8, wherein the blowing device is arranged parallel to the energy store.

10. The brewing module according to claim 1, wherein the capsule recognition position is above the brewing position.

11. A drinks preparation machine comprising a water feed, a pump and a water heater as well as a brewing module according to claim 1.

12. The drinks preparation machine according to claim 11, wherein the blowing device comprises two air connections, of which a first air connection is connected to an air suction tube, and wherein the air suction tube leads from an environment of the water heater to be blowing device, in order to utilize waste heat produced by the water heater.

* * * * *